(12) United States Patent
Kumagai et al.

(10) Patent No.: US 6,714,509 B2
(45) Date of Patent: Mar. 30, 2004

(54) DISK RECORDING MEDIUM AND DISK DRIVE APPARATUS

(75) Inventors: Eiji Kumagai, Kanagawa (JP); Yukio Shishido, Kanagawa (JP); Michihiko Iida, Kanagawa (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 09/943,515

(22) Filed: Aug. 31, 2001

(65) Prior Publication Data

US 2002/0048241 A1 Apr. 25, 2002

(30) Foreign Application Priority Data

Sep. 4, 2000 (JP) .......................................... 2000-267355

(51) Int. Cl.⁷ ................................................ G11B 7/00
(52) U.S. Cl. ................... 369/275.4; 369/47.38
(58) Field of Search .............................. 369/47.1, 47.38, 369/44.39, 47.15, 47.21, 59.1, 53.1, 59.2, 59.25, 59.26, 275.1, 275.2, 273.3, 275.4

(56) References Cited

U.S. PATENT DOCUMENTS 6,188,657 B1 * 2/2001 Kim et al. ............... 369/53.11
6,266,318 B1 * 7/2001 Honda et al. ............. 369/275.3
6,549,495 B1 * 4/2003 Spruit et al. ............. 369/47.19

* cited by examiner

Primary Examiner—Muhammad Edun
(74) Attorney, Agent, or Firm—Oblon, Spivak, McClelland, Maier & Neustadt, P.C.

(57) ABSTRACT

A disk recording medium including a pregroove on which control information is recorded, the control information having disk-compatibility information, and the disk-compatibility information indicating a linear recording velocity corresponding to the disk recording medium.

10 Claims, 6 Drawing Sheets

| 4 BITS | 8 BITS<br>2 DIGIT BCD | 8 BITS<br>2 DIGIT BCD | 8 BITS<br>2 DIGIT BCD | 14 BITS<br>CRC PARITY |
|---|---|---|---|---|
| SYNCHRO-<br>-NIZATION | MINUTE | SECOND | FRAME | |

FIG. 6

| Frame number | Frame contents |
|---|---|
| N | Special information 1 |
| N+1 <br> • <br> N+9 | Normal address |
| N+10 | Special information 2 |
| N+11 <br> • <br> N+19 | Normal address |
| N+20 | Special information 3 |
| N+21 <br> • <br> N+29 | Normal address |
| N+30 | Special information 4 |
| N+31 <br> • <br> N+39 | Normal address |
| N+40 | Additional information 1 |
| N+41 <br> • <br> N+49 | Normal address |
| N+50 | Additional information 2 |
| N+51 <br> • <br> N+59 | Normal address |
| N+60 | Supplement information |
| N+61 <br> • <br> N+69 | Normal address |
| N+70 | Special information 1 |
| N+71 <br> • | Normal address |

DISK RECORDING MEDIUM AND DISK DRIVE APPARATUS

BACKGROUND OF THE INVENTION

1. Field of the Invention

This invention generally relates to a disk recording medium and a disk drive apparatus preferably being applicable to a medium such as Compact Disk-Recordable (CD-R) and Compact Disk-Rewritable (CD-RW). More specifically, this invention relates to a disk recording medium, which can be correctly handled on the basis of disk-compatibility information recorded on it, and a disk drive apparatus for driving such the disk recording medium.

2. Description of the Related Art

Disk recording medium such as CD-R and CD-RW may record data. CD-R is a write-once optical disk using dyed color organic material as recording layer and is compatible with Compact Disk medium (CD). CD-RW is an optical disk allowing data to be written thereon or to be erased therefrom with making a phase change of recording layer in use.

It has been considered to increase a liner velocity, when recording the data on these disks recording media, in order to accelerate their writing time. In a case of the above CD-RW, since its recording layer comprises phase changeable layer for implementing the writing and erasure of data, characteristics of the phase changeable layer necessary to write the data effectively vary according to the liner velocity when recording. When the liner velocity is increased, CD-RW for slow storage (slow CD-RW) having a recording layer for slow storage is unavailable. This brings about changes that CD-RW for fast storage (fast CD-RW) having a recording layer for fast storage is available in this case.

If such the fast CD-RW is so constructed that its pregroove can be made like the same of the slow CD-RW to reduce their differences, with taking its disk-compatibility in consideration, it is impossible to distinguish one from another. Under this condition, when the fast CD-RW is erroneously loaded onto a CD-RW drive apparatus for the slow CD-RW, the apparatus may slowly writes the data on the fast CD-RW. This causes the apparatus to fail to write the data in it and results in failure such as crash of recording layer. The same goes for the above CD-R case.

Accordingly, this invention solves these problems of the related art and an object of the invention is to provide a disk recording medium and so on allowing its correct handling due to its disk-compatibility information.

SUMMARY OF THE INVENTION

According to a first aspect of the invention, we provide a disk recording medium including a pregroove on which control information is recorded. The information comprises disk-compatibility information.

According to a second aspect of the invention, we also provide a disk recording medium including subcode data. The subcode data comprises disk-compatibility information.

Further, according to a third aspect of the invention, we also provide a disk drive apparatus for driving a disk recording medium on which disk-compatibility information is recorded. The apparatus comprises reproducing part for reproducing the disk-compatibility information from the disk recording medium and control part for controlling handling of the disk recording medium on the basis of the reproduced disk-compatibility information.

According to an embodiment of this invention, the disk recording medium may store disk-compatibility information. For example, the medium stores control information including the disk-compatibility information along a pregroove. Alternatively, it may store subcode data including the disk-compatibility information.

Such the control information storage on the pregroove may be illustratively carried out by Bi-phase modulating the control information and wobbling the pregroove in response to signals obtained from frequency-modulation of thus Bi-phase modulated information. For example, the control information including the disk-compatibility information may be stored on the pregroove in a lead-in area of the medium. The subcode data including the disk-compatibility information may be stored on pre-pits in a lead-in area of the medium.

According to another embodiment of this invention, the disk drive apparatus may reproduce the disk-compatibility information from the medium so that the medium can be correctly handled on the basis of the disk-compatibility information. When the apparatus determines that the medium would be unavailable for handling, based on the disk-compatibility information, it stores and reproduces no data on and from the medium.

Thus, this avoids writing the data on the fast CD-RW when it is erroneously loaded onto the slow CD-RW drive apparatus, thereby preventing failure such as an error in data recording and a crash of its recording layer from occurring.

A further understanding of the nature and advantages of the invention may be realized by reference to the following portions of the specification and drawings.

BRIEF DESCRIPTION OF THE DRAWINGS

FIG. 6 is a diagram illustrating encoding embodiment of ATIP frame within a lead-in area as shown in FIG. 4;

DESCRIPTION OF THE PREFERRED EMBODIMENT

Referring the drawings, a CD-RW drive apparatus and a CD-RW disk medium as a preferred embodiment of the invention will be explained more in detail.

Figure 1:
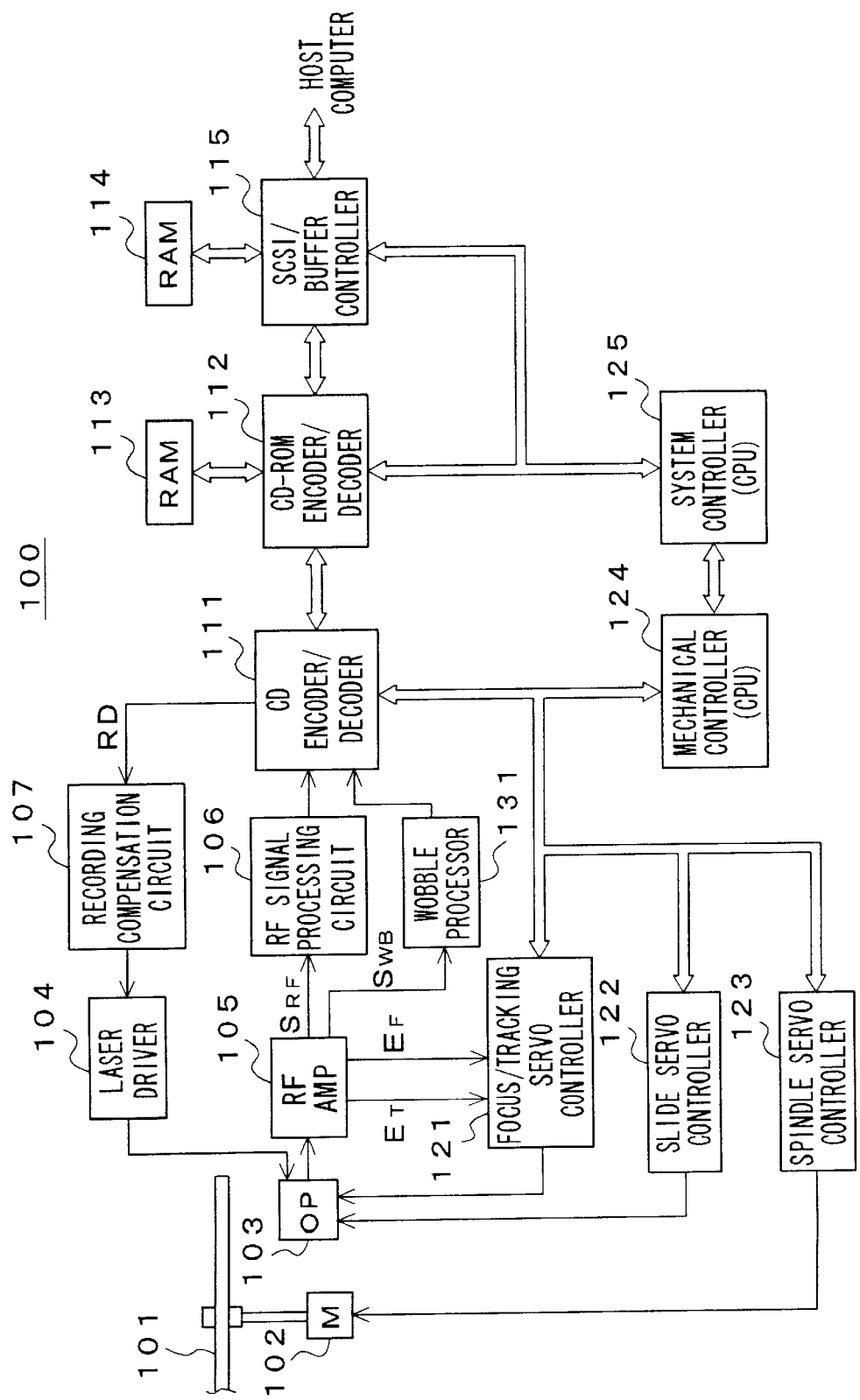
FIG. 1 is a block diagram showing a constitution of CD-RW drive apparatus as a preferred embodiment of the invention.

Referring to FIG. 1, the CD-RW drive apparatus will be explained and referring to FIGS. 2 through 9, the CD-RW disk medium will be explained.

FIG. 1 shows a constitution of the CD-RW drive apparatus 100 for driving the CD-RW disk medium 101.

Figure 2:
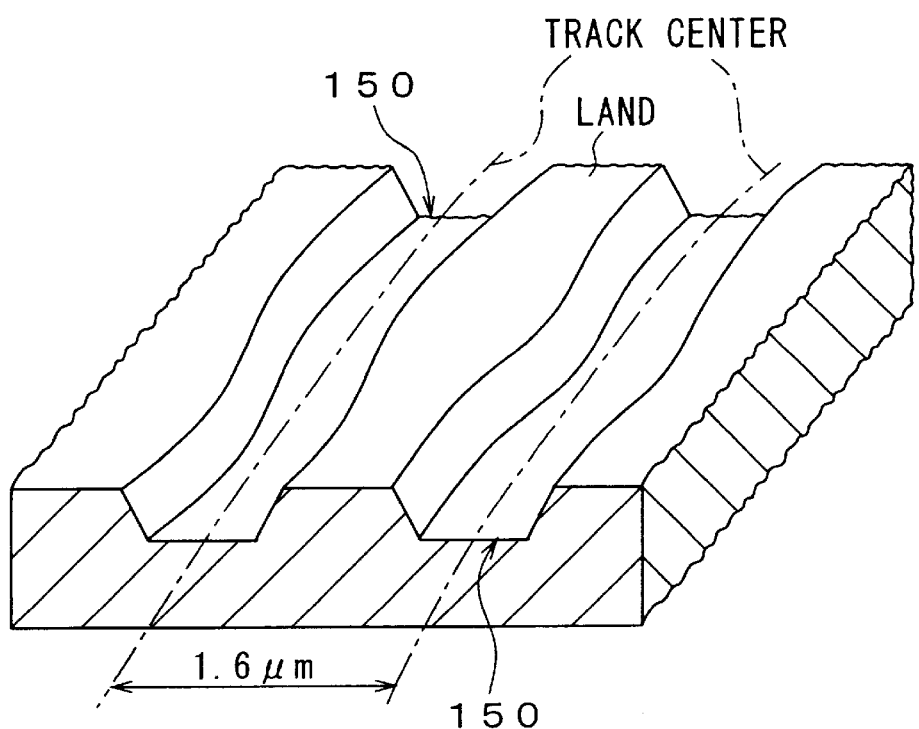
FIG. 2 is a diagram illustrating a wobbled pregroove in a CD-RW disk medium.

The CD-RW disk medium 101 includes a tight spiral pregroove 150 on its recording layer, which is used as a guide track to write and reproduce data. This pregroove 150 having 1.6 μm track pitch is slightly wobbled in a radial way, as shown in FIG. 2, to control a speed of a motor turning the disk using pregroove's position information so that area of the disk under a write or read head is always moving at the same speed. Namely, the data is written or reproduced on or from the disk medium at a constant linear velocity using the pregroove. Such the pregroove is called as an "Absolute Time In Pregroove" (ATIP), which is come up with as address information used for a medium with a relatively long data unit such as CD. Time information stored on the ATIP is the same as the one stored on subcode-Q channel of playback-only CD.

This ATIP includes synchronizing signal for rotating servo when recording and various control signals other than the above address information when recording. The control signals recorded on the ATIP includes a signal indicating the longest writable time between a start time of lead-in and a start time of lead-out when making program length longest, and a signal indicating the most suitable power of recording laser and a type of disk.

Figure 3:
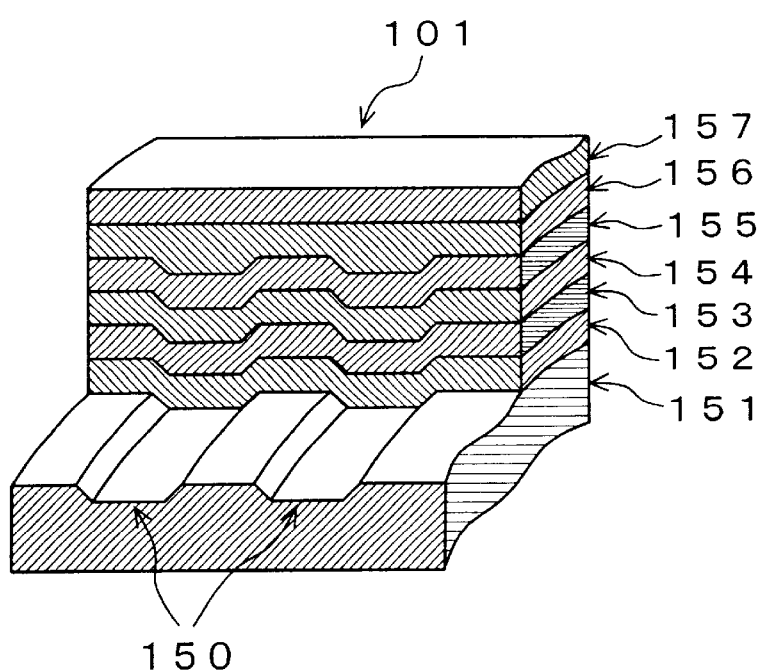
FIG. 3 is a diagram illustrating a cross-sectional view of a portion of the CD-RW disk medium.

In the CD-RW disk medium, as shown in FIG. 3, multi-layer including dielectric layer (ZnS, $SiO_2$) 152, recording layer (Ag—In—Sb—Te) 153, dielectric layer (ZnS, $Sio_2$) 154, reflectance layer (Al) 155, UV hardened protective layer (UV-resin) and a label layer 157 is formed on Polycarbonate substrate 151 in which the pregroove is cut, from its bottom to its top.

When laser irradiates a light beam to the bottom of the disk medium, it causes the recording layer sandwiched between the dielectric layers 152 and 154 to be phase changed depending on the intensity of the recording laser beam. Then, if the recording layer is rapidly melted and cooled, it may become amorphous state while if the layer is gradually heated to the melting point and cooled, it may become crystalline state. The chemical change of material in the recording layer to amorphous state produces a light absorbing state (low reflectivity) while the change to crystalline state produces a reflective state (high reflectivity).

When recording the data on the disk medium using the above phase change technology, we can use crystalline changed portions in the recording layer as pits so that a signal like the one using for a playback-only CD may be reproduced. The material of the recording layer 153 is selected among the ones to be used according to a type of the disk such as fast-recording disk and a slow-recording disk to allow the disk to be adapted for a linear velocity when recording following their usage.

Even when CD-R disk medium, not shown, is used, its layer arrangement is generally the same as the above CD-RW disk medium except that the dielectric layers 152 and 154 and recording layer 153 are placed with a recording layer of dye made from photosensitive organic compounds; and a reflectance layer of the CD-R is made from Ag, not Al.

The laser beam having high-energy actually melts the above organic dye by its heat to create pits (troughs). This allows another laser beam to read them as data after recording the data so that a signal like the one for the playback-only CD including the pits on its substrate may be reproduced.

Figures 4, 5:
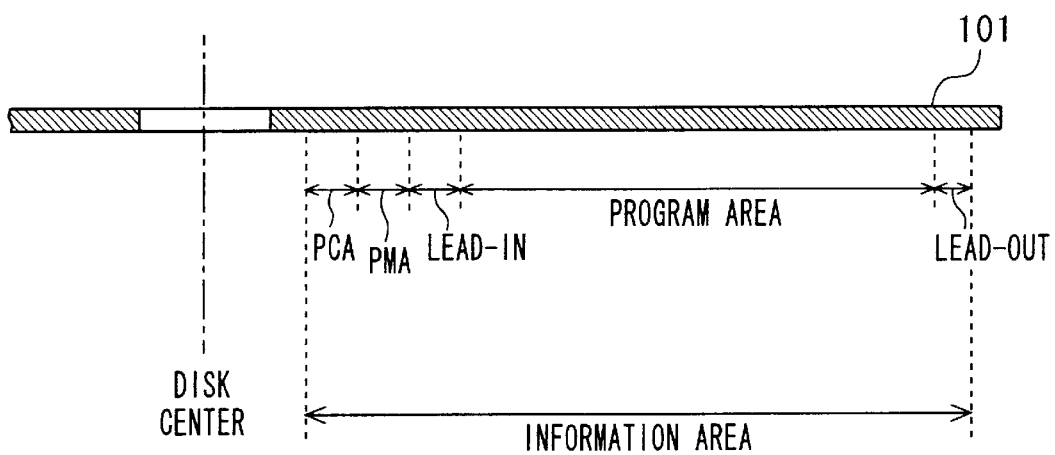
FIG. 4 is a diagram showing a layout of recording areas in the CD-RW disk medium.
FIG. 5 is a diagram illustrating a format of an ATIP frame.

FIG. 4 shows a layout of recording areas of the CD-RW disk medium 101. Arranged are some recording areas such as power calibration area (PCA), program memory area (PMA), lead-in area (LEAD-IN), program area (PROGRAM AREA), and lead-out area (LEAD-OUT), along the direction from a disk center to a disk rim.

The PCA is used for calibrating power of recording laser. The drive apparatus 100 performs a test write of sectors in this PCA area with several different laser power values based on the recommended power, then reads the test sectors back and selects the laser power that produced the sector with the best reflectivity, before recording user's data.

The PMA is used for temporarily storing information about the data recorded on the PROGRAM AREA. The LEAD-IN is used for temporarily containing information of a table of contents (TOC) such as track numbers and their starting and stopping points when tracks are written in a session which is not closed. When the session is closed, the same TOC information is written on this LEAD-IN.

The PROGRAM AREA is used for storing user's data. The LEAD-OUT is used for indicating that end of recording area has been reached.

FIG. 5 illustrates a format of an ATIP frame. A signal having such the ATIP frame is base-band modulated in Bi-Phase modulation system, then frequency modulated. A manufacturer makes the pregroove 150 on the disk medium 101 when mastering so that it is radially wobbled on the basis of thus modulated signal. This frame has the same period as the subcode used in CD-ROM has. When we read the signal in real time, we calculate that the period used for a standard velocity disk will be 75 Hz and thus, for example, the one used for eight-fold acceleration velocity disk will be 8×75 Hz. In doing so, carrier frequency in the frequency modulation used for the standard velocity disk is calculated to be 22.05 kHz. The carrier frequency for the eight-fold acceleration velocity disk is calculated to be 8×22.05 kHz.

FIG. 6 shows an encoding embodiment of the ATIP frame within the LEAD-IN. The ATIP frame includes some areas for special information, additional information, and supplement information in addition to the areas for normal address information. These areas for the special information, the additional information, and the supplement information may store the above information such as the start times of lead-in and lead-out, the most suitable power of recording laser and the type of disk. In this embodiment, the supplement information area stores the linear velocity information as disk-compatibility information. The linear velocity information includes information indicating a recording linear velocity at which the disk 101 is available.

Figure 7:
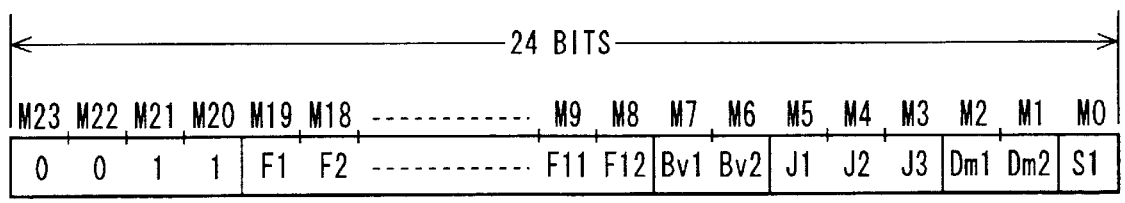
FIG. 7 is a diagram illustrating bits structure of supplement information as shown in FIG. 6.

FIG. 7 shows a bits structure of the supplement information. Two bits of M7–M6, [Bv1, Bv2] represent linear velocity information of the disk. Four bits of M23–M20, [0011], represent the supplement information. Twelve bits of M19–M8, [F1, F2, . . . . . , F11, F12] are reserved for future extension. Three bits of M5–M3, [J1, J2, J3] represent inertia information. Two bits of M2–M1, [Dm1, Dm2] represent information on diameter of the disk. One bit of M0, [S1] represents recording density information of the disk.

Figure 8:
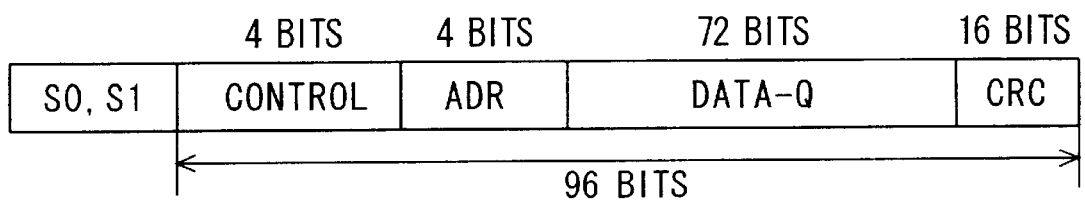
FIG. 8 is a diagram illustrating a data format of subcode-Q.

FIG. 8 shows a data format (a format of frame) of subcode-Q channel recorded on the disk 101. This format of frame comprises control data of four bits, address data of four bits, data (data-Q) of 72 bits and cyclic redundancy check codes (CRC) of 16 bits. In this embodiment, when writing the subcode in the lead-in area of the disk 101, the linear velocity information recorded on the ATIP as the disk-compatibility information as described above may be written on subcode-Q mode 1.

Figure 9:
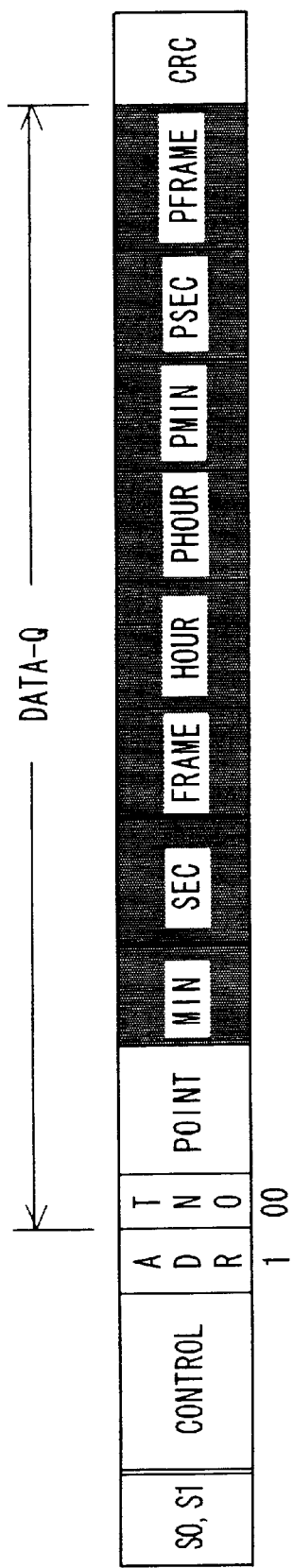
FIG. 9 is a diagram illustrating a data format of subcode-Q mode 1 within a lead-in area.

FIG. 9 shows a data format of the subcode-Q mode 1 within the lead-in area. In this case, address data, 1 h ("h" indicates hexadecimal number, hereinafter the letter, h, will be used in a like manner) represents the mode 1. TNO, 00h represents the lead-in area. In this data format, as POINT represents F0h, the linear velocity information is set on PMIN.

Referring back to FIG. 1, the drive apparatus 100 comprises a spindle motor 102 for rotating the above disk medium 101 in a constant linear velocity. In an embodiment according to the invention, the drive apparatus 100 performs the operation to write and reproduce data on and from the disk in a standard velocity or an eight-fold acceleration velocity.

The drive apparatus 100 also comprises an optical pick-up 103 having a semiconductor laser, an objective lens, and a plurality of photo detectors, a laser driver 104 for controlling emission of the semiconductor laser of optical pick-up 103, and RF amplifier 105 for processing output signals from the photo detectors included in the optical pick-up 103 to produce a reproduced RF signal, SRF, a tracking error signal, ET, a focusing error signal, SF, and a wobble signal SWB which corresponds to the wobbling of pregroove 150.

The recording layer of the disk medium 101 is irradiated with laser beam (not shown) from the semiconductor laser of optical pick-up 103 and then, a plurality of photo detectors of the optical pick-up 103 such as 6-split photo detector is irradiated with its reflected light. The RF amplifier 105 produces the tracking error signal $E_T$ using an appropriate method such as differential push pull (PDD) method and the focusing error signal $E_F$ using an appropriate method such as astigmatic method.

Further, the drive apparatus 100 comprises an RF signal processing circuit 106 for performing a process such as waveform equalization and signal detection against the reproduced RF signals, $S_{RF}$ received from the RF amplifier 105 to produce CD data, and a recording compensation circuit 107 for compensating record data RD received from a CD encoder/decoder 111, which is described later, to transfer thus compensated record data RD to the laser driver 104. Laser beam irradiated from the semiconductor laser of optical pick-up 103 is modulated with thus compensated record data RD, thereby allowing it to be recorded on the disk medium 101 using the above phase change technology.

Additionally, the drive apparatus 100 comprises the CD encoder/decoder 111 and a CD-ROM encoder/decoder 112. When reproducing, the CD encoder/decoder 111 produces CD-ROM data by demodulating the CD data received from the RF signal processing circuit 106 due to an eight to fourteen modulation (EFM) and carrying out a cross-interleaved Reed-Solomon code (CIRC) error correction processing against the CD data.

When recording, the CD encoder/decoder 111 produces the record data RD by performing a non-return to zero-inverted (NRZI) conversion processing against the CD data obtained by adding parity to CD-ROM data received from the CD-ROM encoder/decoder 112 based on the CIRC, and modulating the CD-ROM data due to the EFM.

When reproducing, the CD-ROM encoder/decoder 112 produces read data by de-scrambling and error-correcting the CD-ROM data received from the CD encoder/decoder 111.

When recording, the CD-ROM encoder/decoder 112 produces a CD-ROM data by adding parity for error correction to write data received from a small computer system interface (SCSI)/buffer controller 115, which will be described later more in detail, and scrambling it. This CD-ROM encoder/decoder 112 is connected with a random access memory (RAM) 113 as a work memory for performing the above processes.

Further, the drive apparatus 100 comprises the SCSI/buffer controller 115. The controller 115 receives commands from host computer and transfers them to a system controller 125 having central processing unit(s) (CPU) for controlling the operations of the whole system. When reproducing, the controller 115 transfers the read data received from the CD-ROM encoder/decoder 112 to the host computer through RAM 114 as a buffer memory. When recording, it transfers the write data received from the host computer to the CD-ROM encoder/decoder 112 through RAM 114.

The drive apparatus 100 comprises a focus/tracking servo controller 121, a slide servo controller 122 and a spindle servo controller 123. The focus/tracking servo controller 121 controls the optical pick-up 103 so that it may be focused and tracked in response to focusing error signal $E_F$ and the tracking error signal $E_T$ received from the RF amplifier 105. The slide servo controller 122 controls the optical pick-up 103 so that it may be slid when accessed. The spindle servo controller 123 controls the spindle motor 102 SO that it may rotate at an appropriate number of revolutions. A mechanical controller 124 having CPU controls the operations of these servo controllers 121 through 123.

The drive apparatus 100 comprises a wobble processor 131 for decoding ATIP signals in response to the wobble signals $S_{WB}$ received from the RF amplifier 105. The processor 131 transfers thus decoded ATIP signals to the mechanical and system controllers 124 and 125 through the CD encoder/decoder 111 whereby these signals are used for various controls.

Operations of the CD-RW drive apparatus 100 as shown in FIG. 1 will be described.

When the host computer transfers a data write command to the system controller 125, the drive apparatus 100 starts writing or recording data on the disk medium 101. Since the apparatus 100 can write the data at a standard velocity or eight-fold accelerated one, as described above, the host computer transfers information about an indication of disk recording speed to the apparatus 100 in addition to the above data write command.

When the disk medium (CD-RW disk) 101 is loaded onto the drive apparatus 100, the apparatus reads the stored data from the lead-in area of the disk medium 101 to acquire ATIP signals. Thus, the system controller 125 may also acquire the linear velocity information as the disk-compatibility information set in the supplement information area in the lead-in area. If thus acquired linear velocity fails to correspond to the disk recording speed indicated by the host computer, the system controller 125 tell the host computer that it is impossible to write.

If the acquired linear velocity corresponds to the disk recording speed, the controller 125 starts writing the data. The controller 125 controls the revolution of disk medium 101 so that the data may be written on it at an appropriate linear velocity corresponding to the indicated disk recording speed. The SCSI/buffer controller 115 receives the write data from the host computer and transfers it to the CD-ROM encoder/decoder 112. The CD-ROM encoder/decoder 112 adds parity for error correction to the write data and scrambles it to produce CD-ROM data.

The CD encoder/decoder 111 receives thus produced CD-ROM data from the CD-ROM encoder/decoder 112. The CD encoder/decoder 111 adds parity under CIRC to the CD-ROM data and modulates it due to the EFM to produce the CD data and then, performs NRZI conversion against the CD data to produce the record data RD.

The recording compensation circuit 107 compensates the record data RD and transfers it to the laser driver 104. The semiconductor laser of the optical pick-up 103 irradiates the laser beam modulated in response to thus compensated recording data RD to the disk medium 101 wherein phase change occurs in response to the record data RD and the record data RD is written on the disk medium 101.

After the apparatus 100 quits writing the data from the host computer on the disk medium 101, it also writes subcode on the lead-in area of the disk medium 101. In this case, the linear velocity information as the disk-compatibility information recorded on the ATIP as described above is written on the lead-in area as subcode-Q model 1.

When the host computer transfers a data read command to the system controller 125, the drive apparatus 100 starts reading or reproducing data from the disk medium 101. Since the apparatus 100 can write the data at a standard velocity or eight-fold accelerated one as described above, the host computer transfers information about an indication of disk reproducing speed to the apparatus 100 in addition to the above data read command. The controller 125 controls the revolution of disk medium 101 so that the data may be read from the disk medium 101 at an appropriate linear velocity corresponding to the indicated disk reproducing speed.

The pick-up 103 reproduces the reproduced RF signal. The RF signal processing circuit 106 performs a process such as waveform equalization against the reproduced RF signal to produce CD data. The CD encoder/decoder 111 receives thus produced CD data from the RF signal processing circuit 106. The CD encoder/decoder 111 performs the EFM demodulation against the produced CD data and adds parity for error correction under CIRC to it to produce the CD-ROM data.

The CD-ROM encoder/decoder 112 receives thus produced CD-ROM data from the CD encoder/decoder 111 and descrambles and error corrects it to produce the read data. This read data is timely transferred to the host computer through the RAM 114 as the buffer memory under the control of the SCSI/buffer controller 115.

Thus, according to an embodiment of the invention, since the linear velocity information as the disk-compatibility information is stored in the supplement information area as the ATIP signals recorded in the pregroove 150 of the lead-in area of the disk medium (CD-RW disk) 101, system controller 125 can acquire this linear velocity information when the disk medium 101 is loaded onto the apparatus 100. If thus acquired linear velocity fails to correspond to the disk recording speed indicated by the host computer, the system controller 125 tell the host computer that it is impossible to write, thereby stopping writing the data on the disk medium 101. This avoids writing the data either on the standard velocity disk medium at eight-fold accelerated velocity or on the eight-fold accelerated velocity disk medium at standard velocity when these disk media are erroneously loaded onto the apparatus 100. Therefore, it prevents a failed storage and a recording layer crash from occurring.

According to another embodiment of the invention, after the apparatus 100 quits writing the data from the host computer on the disk medium 101, it writes subcode on the lead-in area. In this case, the linear velocity information as the disk-compatibility information stored on the ATIP is written as subcode-Q model 1, as described above. When thus recorded disk medium 101 is loaded onto a playback-only drive apparatus, the linear velocity information can be acquired from the subcode data reproduced from the lead-in area. Based on this linear velocity information, various reproducing processes such as waveform equalization can be performed.

Although, according to the above embodiments, the linear velocity information as the disk-compatibility information is stored in the supplement information area, it may be stored on other portion of the pregroove.

Although, according to the above embodiments, the invention is applied to CD-RW disk medium 101 and CD-RW drive apparatus 100, it may be also applied to other disk recording medium and/or a disk drive apparatus such as CD-R disk medium and CD-R drive apparatus.

Although, according to the above embodiments, the linear velocity information is used as the disk-compatibility information, other information about the disk-compatibility such as recording system information may be also used.

Particularly, when a playback-only disk recording medium is applied, disk-compatibility information may be stored on subcode data recorded using pre-pits in its lead-in area.

While the above is a complete description of the preferred embodiments of the invention, various alternatives, modifications, and equivalents thereof may be used. Therefore, the above description should not be taken as limiting the scope of the invention as defined by the appended claims.

What is claimed is:

1. A disk recording medium comprising:
    a pregroove on which control information is recorded,
    said control information comprising disk-compatibility information, and
    said disk-compatibility information indicating a linear recording velocity corresponding to said disk recording medium.

2. The disk recording medium according to claim 1, wherein said pregroove is wobbled in response to a signal obtained by frequency modulation of said control information that has been Bi-Phase modulated, thereby allowing said control information to be recorded on the pregroove.

3. The disk recording medium according to claim 1, wherein said control information including disk-compatibility information is recorded on a lead-in area of the medium.

4. A disk recording medium comprising:
    subcode data, said subcode data comprising disk-compatibility information, and
    said disk-compatibility information indicating a linear recording velocity corresponding to said disk recording medium.

5. The disk recording medium according to the claim 4, wherein said subcode data including the disk-compatibility information is recorded using a pre-pit.

6. The disk recording medium according to claim 4, wherein said subcode data including the disk-compatibility information is recorded on a lead-in area of the medium.

7. A disk drive apparatus adapted for driving a disk recording medium on which disk-compatibility information is recorded, said disk-compatibility information indicating a linear recording velocity corresponding to said disc recording medium, and said apparatus comprising:
    reproducing means for reproducing said linear recording velocity from said disk recording medium; and
    control means for controlling said disk recording medium on the basis of the reproduced linear recording velocity.

8. The disk drive apparatus according to the claim 7, wherein when said disk recording medium includes a pregroove on which the control information comprising disk-compatibility information is recorded, said reproducing means reproduces said disk-compatibility information from said control information.

9. The disk drive apparatus according to the claim 7, wherein when said disk recording medium includes subcode data, said subcode data comprising said disk-compatibility information, said reproducing means reproduces said disk-compatibility information from said subcode data.

10. A disk drive apparatus adapted for driving a disk recording medium on which disk-compatibility information is recorded, said apparatus comprising:

reproducing means for reproducing said disk-compatibility information from said disk recording medium; and control means for controlling handling of said disk recording medium on the basis of the reproduced disk-compatibility information.

wherein said control means controls the handling of said disk recording medium to prevent data from being recorded or reproduced on or from said disk recording medium when the apparatus determines that it is impossible to record or reproduce the data on or from said disk recording medium based on said disk-compatibility information.

* * * * *